United States Patent
Jackson et al.

(10) Patent No.: US 7,341,675 B2
(45) Date of Patent: Mar. 11, 2008

(54) LIQUID CRYSTALLINE POLYMER COMPOSITION

(75) Inventors: Richard Alan Jackson, Glen Allen, VA (US); Marion G. Waggoner, Landenberg, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 139 days.

(21) Appl. No.: 11/402,734

(22) Filed: Apr. 12, 2006

(65) Prior Publication Data

US 2006/0231793 A1    Oct. 19, 2006

Related U.S. Application Data

(60) Provisional application No. 60/672,797, filed on Apr. 19, 2005.

(51) Int. Cl.
| | |
|---|---|
| *C09K 19/38* | (2006.01) |
| *C09K 19/52* | (2006.01) |
| *C09K 19/32* | (2006.01) |
| *C09K 19/20* | (2006.01) |
| *C09K 19/54* | (2006.01) |
| *C08G 63/02* | (2006.01) |
| *C08G 63/06* | (2006.01) |

(52) U.S. Cl. ............... 252/299.01; 252/299.5; 252/299.62; 252/299.67; 528/176; 528/190; 528/193; 528/194

(58) Field of Classification Search ........... 252/299.01, 252/299.5, 299.62, 299.67; 528/176, 190, 528/193, 194
See application file for complete search history.

(56) References Cited

U.S. PATENT DOCUMENTS

| 4,067,852 | A |   | 1/1978  | Calundann |
|---|---|---|---|---|
| 4,169,933 | A |   | 10/1979 | Jackson, Jr. et al. |
| 5,110,896 | A | * | 5/1992  | Waggoner et al. ........... 528/190 |
| 5,250,654 | A | * | 10/1993 | Alms et al. ................. 528/193 |
| 6,121,369 | A |   | 9/2000  | Stack et al. |
| 6,306,946 | B1 | * | 10/2001 | Long et al. ................. 524/451 |
| 6,348,163 | B1 |   | 2/2002  | Long et al. |
| 2004/0058137 | A1 |   | 3/2004  | Okamoto et al. |

FOREIGN PATENT DOCUMENTS

WO    WO 95/33803    * 12/1995

OTHER PUBLICATIONS

W. Jerome Jackson, The British Polymer Journal, 1980, pp. 154-162, p. 158, 159.

* cited by examiner

*Primary Examiner*—Shean C Wu

(57) ABSTRACT

Liquid crystalline polymers containing specified ratios of repeat units derived from hydroquinone, 2,6-naphthalenedicarboxylic acid, 4-hydroxybenzoic acid and optionally terephthalic acid have exceptionally high heat distortion temperatures, making especially useful for service at high temperatures. Compositions containing reinforcing agents, especially fibrous or platy reinforcing agents are particularly useful. These polymers and compositions are useful for electrical and electronic connectors, and as films for the electronics industry, and for other uses.

7 Claims, No Drawings

LIQUID CRYSTALLINE POLYMER COMPOSITION

CROSS REFERENCE TO RELATED APPLICATIONS

This application claims the benefit of priority to U.S. Provisional Application No. 60/672,797, filed Apr. 19, 2005.

FIELD OF THE INVENTION

Liquid crystalline polymers made from hydroquinone, 2,6-naphthalenedicarboxylic acid, 4-hydroxybenzoic acid and optionally small amounts of terephthalic acid have surprisingly high heat deflection temperatures, making them especially suitable in applications at high temperatures.

TECHNICAL BACKGROUND

Thermotropic liquid crystalline polymers (LCPs) are important items of commerce. They are particularly noted for their good melt forming characteristics, often low flammability, and in many cases usefulness at higher temperatures. One goal with LCPs has been to develop polymers with higher and higher temperature capabilities.

Polyester LCPs derived from hydroquinone (HQ), terephthalic acid (TA), 2,6-naphthalenedicarboxylic acid (NDA), 4-hydroxybenzoic acid (HBA) are known, see for instance U.S. Pat. Nos. 4,169,933, 6,121,369 and 6,306,946. In all of these references the LCPs actually made had relatively (compared to the LCPs described herein) high amounts of repeat units derived from terephthalic acid in them.

In particular, U.S. Pat. No. 6,306,946 reports the variation of certain properties of the LCPs with changes in polymer composition. In FIG. 8 of this patent the variation of Heat Deflection Temperature (HDT) with polymer composition is given in the form of a contour plot and an equation to predict HDT as a function of polymer composition. HDT is a property that is often used to predict the (relative) usefulness of polymers at higher temperatures. In essence it measures the stiffness (more accurately the resistance to bending) of a polymer as the temperature is increased. Usually the higher the HDT, the higher the temperature the polymer may be used in any given use. The LCPs described herein surprisingly have much higher HDTs than are predicted by the equation at the bottom of FIG. 8(Equation C) of U.S. Pat. No. 6,306,946.

U.S. Pat. No. 4,067,852 discloses polymers having repeat units derived from hydroquinone, 2,6-naphthalenedicarboxylic acid and 4-hydroxybenzoic acid. The only example of such a polymer reported in this patent contains a much higher level of repeat units derived from 4-hydroxybenzoic acid than the polymers claimed herein.

SUMMARY OF THE INVENTION

This invention concerns a composition comprising a liquid crystalline polymer consisting essentially of repeat units derived from:

(a) 100 molar parts of hydroquinone;

(b) about 85 to 100 molar parts of 2,6-naphthalenedicarboxylic acid;

(c) 0 to about 15 molar parts of terephthalic acid; and (d) about 50 to about 150 molar parts of 4-hydroxybenzoic acid; and provided that:

the total molar parts of (b) plus (c) is 100; and when said molar parts of said 2,6-naphthalenedicarboxylic acid is about 85 to 88, said molar parts of said 4-hydroxybenzoic acid is about 50 to about 130.

Also disclosed herein are filled polymers and shaped parts of this LCP composition.

DETAILS OF THE INVENTION

Herein the LCP is "derived" from certain monomers. By derived is meant the repeat unit is not necessarily the monomer used but is derived from it or a derivative of that monomer in the polymerization reaction. For example, in one common method of making the present LCPs, a HQ diester such hydroquinone diacetate, an ester of HBA acid such as 4-hydroxybenzoic acid acetate, TA and NDA are reacted together to form the LCP. The esters may be added to the process as the ester, or the esters may be formed in situ, for example by reaction with a carboxylic anhydride such as acetic anhydride.

In preferred LCPs there are 1 to 12 molar parts of repeat units derived from TA and 88 to 99 molar parts of repeat units derived from NDA, more preferably 3 to 10 molar parts of repeat units derived from TA and 90 to 97 molar parts of repeat units derived from NDA, and/or there are about 75 to about 125 molar parts of repeat units derived from HBA present in the polymer.

By "consisting essentially of" herein is meant the named constituents plus any other constituents that do not change the essential character of the LCP. This may include for example small amounts of other compounds that may be polymerized into the LCP (act as monomers) which are normal impurities in the monomers used. By "comprising" herein is meant the named constituents, plus any other constituents.

The LCPs may be made by methods well known in the art. As noted above esters of the HQ and HBA may be reacted with the TA and NDA under heating, while distilling off the byproduct carboxylic acid, such as acetic acid. When the production of acetic acid a elevated temperature slows the low molecular weight polymer (sometimes called a prepolymer) formed is subjected to vacuum while maintaining a high temperature. The polymer may then be raised to the desired molecular weight by continuing the polymerization process under heating and vacuum. Alternatively the prepolymer (or a some somewhat higher molecular weight polymer) may be solidified and the solid polymer raised to the desired molecular weight under mild heating and vacuum and/or a flow of inert gas. A similar process may be carried out using phenolic esters of the TA and NDA together with HQ and HBA. The process is run similarly to the acetate ester process except the phenol from which the phenyl ester is derived is made as a byproduct. These types of processes are well known in the art.

These LCPs may be mixed with other typical ingredients used in LCP compositions to form compositions comprising the LCP. Such materials include fillers and reinforcing agents such as glass fiber, hollow or solid glass spheres, minerals such as clay, mica, talc and wollastonite, carbon fiber, pigments such as carbon black and $TiO_2$, metal oxides and/or carbonates, inorganic fibrous materials such as silica, alumina, boron nitride, and potassium titanate fiber or fibrids, organic fibers such as aramid fiber, mold release and mold lubricants, and flame retardants (however these particular LCPs inherently have relatively good flammability resistance), as well as other polymers to form polymer blends. Other useful materials and their typical concentrations in such compositions are found in U.S. Pat. No. 6,306,946, which is hereby include by reference.

Particularly useful additives are one or more fillers and reinforcing agents, preferably in an amount of about 5 to about 100 parts by weight, more preferably about 10 to about 70 parts by weight per 100 parts by weight of LCP present. Particularly useful reinforcing agents are materials which are fibrous or platy, i.e., have an average aspect ratio of about 2 or more, more preferably about 3 or more (by an aspect ratio is meant the longest dimension of the material "particle" divided by the shortest dimension, for example for a fiber this will typically be the length divided by the smallest cross sectional measurement). Useful platy materials include talc and mica, and useful fibers include carbon fibers, glass fibers, and aramid fibers, and glass fibers are particularly preferred.

Such compositions typically can be made by the well known technique of melt mixing the ingredients in typical thermoplastics melt processing equipment such as a kneader or single or twin screw extruders. By melt mixing is meant the mixing is done while the LCP is molten. The other ingredients, depending on their melting point, may or may not be molten.

The LCP itself or a composition containing the LCP may be formed by well known processes into pellets or particles suitable for feeding to thermoplastics melt forming equipment. In melt forming equipment the composition, and in particular usually the LCP, is melted, formed while molten into a shape, and the cooled to solidify the composition and hold the desired shape. This is how a shaped part is made. Typical melt forming methods (and the corresponding equipment for carrying them out) include injection molding, extrusion (particularly to form sheet, film or profiles), blow molding, and thermoforming.

Useful types of parts or their components that can be made with these LCPs include electrical and electronic connectors, circuit boards, housings for various uses, automotive parts, cookware/bakeware, applications where ceramics are replaced such as high temperature light sockets, and light emitting diodes housings and/or mountings.

Herein the HDT is measured by ASTM Method D648, at a load of 1.82 MPa.

In the Examples Tensile Strength (TS) and Tensile Elongation at Break (EB) were measured by ASTM Method D638 at an extension rate of 5.1 mm/min (0.2 in/min) using a Type I bar. In this test strain gauges were used to accurately measure elongation. Flexural Strength (FS) and Flexural Modulus (FM) were measured by ASTM Method D790. The melting point (Tm) of the polymer was measured by ASTM method D3418 at a heating rate of 20° C./min, and taken on the second heat. The melting point was taken as the peak of melting endotherm.

EXAMPLES 1-10

Monomers and acetic anhydride in the molar proportions indicated in Table 1 were weighed out into a 3 L resin kettle fitted with a ground glass top and agitator. The amounts of materials used for the polymer of Example 1 were typical, hydroquinone 249.3 g (an 8% molar excess of that required for the amount of dicarboxylic acids used), terephthalic acid 34.8 g, 2,6-naphthalenedicarboxylic acid 408.0 g, 4-hydroxybenzoic acid 289.6 g, and acetic anhydride 710.3 g (a 5% molar excess). Also added was a "catalyst package" of 0.192 g potassium p-hydroxybenzoate, 0.710 g of Sandostab® P-EPQ (available from Clariant Corp., Charlotte, N.C. 28205, USA) and 0.375 g of magnesium acetate hydrate (lower catalyst levels may be desirable under certain conditions to minimize thermal degradation during polymerization). Similar total amounts of ingredients were used to make the other LCPs.

A 25 mm inside diameter×400 mm high packed a column was connected to the ground glass top and the top of the column was fitted with a reflux splitter, and condenser. After the reactants were charged, the apparatus was connected as described, a nitrogen gas flush was started, and a liquid metal bath heated to 160° C. was raised into position to heat approximately 75% of the lower portion of the kettle. At this time, the reflux splitter was adjusted so that 100% of the condensed vapors were returned to the kettle. The process was operated with agitation and 100% reflux for 30 min. Then, the splitter was partially opened until an estimated 75% of the condensed material was returned to the kettle and 25% was removed to a product receiver. Next, the temperature of the metal bath was raised from 160° C. to 360° C. over a period of approximately 3 h. The pressure was maintained at one atmosphere throughout. After the temperature reached 360° C., the column was removed and the kettle was fitted with a takeoff going to a vacuum system. Then, the temperature was raised to 370-380 degrees C. while the pressure was reduced to full vacuum (10 mm of Hg or less) over a time period of about 1 hour. The reduced pressure was maintained until the stirring motor reached maximum torque at an agitator speed of 30 rpm. Then, the nitrogen flush was terminated, the agitator was stopped, and the kettle was opened and the product was removed from the kettle as a solid.

The polymers were then compounded on a 28 mm Werner and Pfleiderer twin screw extruder. The extruder barrels and die were set at 350-360° C., and the screws were run at 200 rpm. All materials were rear fed and typical throughputs were about 7-11 kg/h. For all the Examples except Examples 1, 6, 8 and 9 the composition made contained 70 weight percent LCP and 30 weight percent glass fiber (from Owens Corning, Toledo, Ohio, USA), while for Examples 1, 6, 8 and 9 the composition was 67.8% LCP, 2.0 weight percent TiO$_2$ (Grade R100, available from E. I. DuPont de Nemours & Co., Wilmington, DE 19899 USA), 0.2 weight percent Licowax® PE190 (a polyethylene wax available from Clariant Corp., Charlotte, N.C. 28205, USA), and 30 weight percent fiberglass. After exiting the extruder as strands the compositions were cut into pellets.

These pellets were molded into appropriate test pieces. The pelletized samples were dried overnight (16 h) at. 150° C. The dried pellets were molded on an Arburg injection molding machine equipped with a barrel with a 43 g (1.5 ounce) shot capacity. The barrel and nozzle temperatures were set at 360° C. and the mold temperature was set at 70° C. The cycle time was 10 sec injection and 15 sec mold cooling (hold). Injection pressures ranged from about 20 to about 28 MPa.

Table 1 lists the compositions of the polymers made. Also listed are properties of the 30% by weight of glass fiber compositions described above. However the Tm's listed were measured on the pure (uncompounded) LCPs.

TABLE 1

| Ex. | Molar Parts | | | | TS MPa | EB % | FS MPa | FM GPa | Tm °C | HDT Found | HDT Calc. |
| --- | --- | --- | --- | --- | --- | --- | --- | --- | --- | --- | --- |
| | HQ | TP | NDA | HBA | | | | | | | |
| 1  | 100 | 10 | 90  | 100 | 142  | 2.08 | 186 | 13.8 | 349 | 309 | 275 |
| 2  | 100 | 10 | 90  | 100 | 63.3 | 0.69 | 109 | 10.5 | 359 | 295 | 275 |
| 3  | 100 | 10 | 90  | 100 | 172  | 2.35 | 209 | 14.3 | 348 | 323 | 275 |
| 4  | 100 | 5  | 95  | 100 | 121  | 1.94 | 161 | 11.6 | 355 | 302 | 273 |
| 5  | 100 | 5  | 95  | 100 | 102  | 1.4  | 168 | 13.7 | 361 | 332 | 273 |
| 6  | 100 | 0  | 100 | 100 | 57.8 | 0.71 | 123 | 12.0 | 366 | 305 | 271 |
| 7  | 100 | 0  | 100 | 100 | 60.5 | 0.66 | 142 | 12.3 | 367 | 323 | 271 |
| 8  | 100 | 0  | 100 | 150 | 115  | 1.57 | 159 | 11.9 | 346 | 306 | 293 |
| 9  | 100 | 0  | 100 | 130 | 87.5 | 0.98 | 155 | 13.2 | 351 | 302 | 287 |
| 10 | 100 | 0  | 100 | 125 | 77.3 | 1.06 | 140 | 12.3 | 359 | 329 | 285 |

In Table 1 the "Calc. HDT" is the calculated HDT of the LCP using "Equation C" (see col. 9-10 and FIG. 8) of U.S. Pat. No. 6,306,946. For some of the polymers listed more than one preparation is shown. While the values for the "Found HDT" and other properties vary to some extent, all of the Found HDTs are surprisingly well above the values calculated from Equation C of U.S. Pat. No. 6,306,946. In Table 1 the "Found HDTs" are an average of about 35° C. higher calculated HDTs.

What is claimed is:

1. A composition comprising a liquid crystalline polymer consisting essentially of repeat units derived from:
   (a) 100 molar parts of hydroquinone;
   (b) about 88 to 99 molar parts of 2,6-naphthalenedicarboxylic acid;
   (c) 1 to about 12 molar parts of terephthalic acid; and
   (d) about 50 to about 150 molar parts of 4-hydroxybenzoic acid; and provided that:
   the total molar pads of (b) plus (c) is 100; and
   when said molar parts of said 2,6-naphthalenedicarboxylic acid is about 85 to 88, said molar parts of said 4-hydroxybenzoic acid is about 50 to about 130.

2. The composition as recited in claim 1 which contains 3 to about 10 molar parts of repeat units derived from said terephthalic acid and about 90 to 97 molar parts of repeat units derived from said 2,6-naphthalenedicarboxylic acid.

3. The composition as recited in claim 1 which contains about 75 to about 125 molar parts of repeat units derived from said 4-hydroxybenzoic acid.

4. Shaped part of the composition of any one of the preceding claims.

5. The composition of any one claims 1 to 3 additionally comprising about 5 to about 100 parts by weight per 100 parts of said liquid crystalline polymer of one or more reinforcing agents having an aspect ratio of 2 or more.

6. The composition of claim 5 wherein said reinforcing agents are platy or fibrous.

7. The composition of claim 5 wherein said reinforcing agents comprise glass fiber.

* * * * *